(12) United States Patent
Kimura et al.

(10) Patent No.: US 9,978,531 B2
(45) Date of Patent: May 22, 2018

(54) SOLID ELECTROLYTIC CAPACITOR AND METHOD FOR MANUFACTURING SAME

(71) Applicant: Murata Manufacturing Co., Ltd., Nagaokakyo-shi, Kyoto-fu (JP)

(72) Inventors: Yuji Kimura, Nagaokakyo (JP); Hitoshi Kuromi, Nagaokakyo (JP); Koji Fujimoto, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 55 days.

(21) Appl. No.: 14/944,565

(22) Filed: Nov. 18, 2015

(65) Prior Publication Data

US 2016/0071654 A1    Mar. 10, 2016

Related U.S. Application Data

(63) Continuation of application No. PCT/JP2014/061213, filed on Apr. 22, 2014.

(30) Foreign Application Priority Data

May 19, 2013   (JP) .................................. 2013-105684

(51) Int. Cl.
*H01G 9/10* (2006.01)
*H01G 9/15* (2006.01)
*H01G 9/012* (2006.01)
*H01G 9/14* (2006.01)
*H01G 9/26* (2006.01)
(Continued)

(52) U.S. Cl.
CPC ............. *H01G 9/10* (2013.01); *H01G 9/0036* (2013.01); *H01G 9/012* (2013.01); *H01G 9/025* (2013.01); *H01G 9/14* (2013.01); *H01G 9/15* (2013.01); *H01G 9/26* (2013.01)

(58) Field of Classification Search
None
See application file for complete search history.

(56) References Cited

U.S. PATENT DOCUMENTS 5,036,434 A * 7/1991 Kobayashi ............. H01G 2/065
29/25.03
5,142,452 A * 8/1992 Saiki ...................... H01G 9/012
29/25.03
(Continued)

FOREIGN PATENT DOCUMENTS

JP    H02-263424 A    10/1990
JP    H06-84716 A     3/1994
(Continued)

OTHER PUBLICATIONS

International Search Report issued for PCT/JP2014/061213, dated Aug. 5, 2014.

(Continued)

*Primary Examiner* — Dion R Ferguson
(74) *Attorney, Agent, or Firm* — Arent Fox LLP

(57) ABSTRACT

A solid electrolytic capacitor that includes a positive external electrode electrically connected to a core part of a valve-acting metal base included in a capacitor element, a first conductive layer in direct contact with the core part of the valve-acting metal base and covering one end surface of the valve-acting metal base and at least a part of an exterior located around the end surface.

10 Claims, 2 Drawing Sheets

(51) Int. Cl.
*H01G 9/00* (2006.01)
*H01G 9/025* (2006.01)

(56) References Cited

U.S. PATENT DOCUMENTS

| | | | | |
|---|---|---|---|---|
| 5,568,354 | A | * 10/1996 | Taniguchi | H01G 9/012 |
| | | | | 361/540 |
| 6,392,869 | B2 | * 5/2002 | Shiraishi | H01G 9/012 |
| | | | | 361/523 |
| 6,909,596 | B2 | 6/2005 | Shimoyama et al. | |
| 6,977,807 | B2 | 12/2005 | Arai et al. | |
| 2002/0001169 | A1 | 1/2002 | Shiraishi et al. | |
| 2004/0264111 | A1 | 12/2004 | Shimoyama et al. | |
| 2005/0047060 | A1 | 3/2005 | Arai et al. | |
| 2011/0261503 | A1 | * 10/2011 | Aoyama | H01G 9/0029 |
| | | | | 361/524 |

FOREIGN PATENT DOCUMENTS

| | | | |
|---|---|---|---|
| JP | 2001-267186 | A | 9/2001 |
| JP | 2002-319522 | A | 10/2002 |
| JP | 2005-26257 | A | 1/2005 |
| JP | 2005-026257 | A | 1/2005 |
| JP | 2005-79463 | A | 3/2005 |

OTHER PUBLICATIONS

Written Opinion of the International Searching Authority issued for PCT/JP2014/061213, dated Aug. 5, 2014.

* cited by examiner

FIG. 4 - PRIOR ART

SOLID ELECTROLYTIC CAPACITOR AND METHOD FOR MANUFACTURING SAME

CROSS REFERENCE TO RELATED APPLICATIONS

The present application is a continuation of International application No. PCT/JP2014/061213, filed Apr. 22, 2104, which claims priority to Japanese Patent Application No. 2013-105684, filed May 19, 2013, the entire contents of each of which are incorporated herein by reference.

FIELD OF THE INVENTION

This invention relates to a solid electrolytic capacitor and a method for manufacturing the capacitor, and more particularly, to an improvement for suppressing undesirable moisture ingress into the solid electrolytic capacitor.

BACKGROUND OF THE INVENTION

Solid electrolytic capacitors of interest to this invention include a capacitor as described in, for example, Japanese Patent No. 4439848 (Patent Document 1). Patent Document 1 discloses, as an embodiment, a solid electrolytic capacitor structured as shown in FIG. 4.

Referring to FIG. 4, the solid electrolytic capacitor 1 includes a laminated body 3 that has a plurality of capacitor elements 2 laminated. Each capacitor element 2 includes a valve-acting metal base 6 that has an aluminum layer 4 as a core part and a porous layer 5 as a rough surface part, which is formed on the surface of the aluminum layer 4. On the surface of the porous layer 5, a dielectric coating film (not shown) is formed, a solid electrolyte layer 7 is formed on the dielectric coating film, and a collector layer 8 is formed on the solid electrolyte layer 7.

The plurality of capacitor elements 2 bonded to each other with a conductive adhesive 9 interposed therebetween constitute the laminated body 3. The conductive adhesive 9 mechanically fixes the adjacent capacitor elements 2 to each other, and electrically connects the respective collector layers 8 of the adjacent capacitor elements 2 to each other. For example, a negative electrode terminal member 10 is inserted between specific capacitor elements 2, and electrically connected to the collector layers 8.

The laminated body 3 is covered by an exterior 11 of an electrically insulating resin. In this case, one end surface 12 of the valve-acting metal base 6 is adapted to be exposed on a first end surface 13 of the exterior 11, and one end surface 15 of the negative electrode terminal member 10 is adapted to be exposed on a second end surface 14 opposed to the first end surface 13 of the exterior 11.

A positive-electrode external electrode 16 is provided on the first end surface 13 of the exterior 11, whereas a negative-electrode external electrode 17 is provided on the second end surface 14. The positive-electrode external electrode 16 is electrically connected to the aluminum layer 4 of the valve-acting metal base 6, whereas the negative-electrode external electrode 17 is electrically connected to the collector layer 8 with the negative-electrode terminal member 10 interposed therebetween.

On the end surface 12 of the valve-acting metal base 6, a zinc layer 18 is formed which serves as a part of the positive-electrode external electrode 16. The zinc layer 18 is formed by zinc substitution in a way that the aluminum layer 4 and dielectric coating film exposed from the exterior 11 are immersed in a sodium hydroxide solution containing zinc, or a hydrofluoric acid or ammonium fluoride solution containing zinc. On the zinc layer 18, a first nickel layer 19 is formed which serves as a part of the positive-electrode external electrode 16. The first nickel layer 19 is formed by immersion in a solution containing a nickel salt and a boron hydroxide compound.

The positive-electrode external electrode 16 further has a second nickel layer 20 on the first nickel layer 19, a copper layer 21 thereon, a third nickel layer 22 thereon, and a tin layer 23 thereon. The second nickel layer 20 is formed by an electroless plating method, and the copper layer 21, the third nickel layer 22, and the tin layer 23 are formed by an electrolytic plating method.

The negative-electrode external electrode 17 includes the second nickel layer 20, the copper layer 21 thereon, the third nickel layer 22 thereon, and the tin layer 23 thereon, which are also included in the positive-electrode external electrode 16. As is the case in the positive-electrode external electrode 16, the second nickel layer 20 in the negative-electrode external electrode 17 is formed by an electroless plating method, whereas the copper layer 21, the third nickel layer 22, and the tin layer 23 are formed by an electrolytic plating method.

Patent Document 1: Japanese Patent No. 4439848

SUMMARY OF THE INVENTION

In the solid electrolytic capacitor 1, there is a possibility that undesirable moisture is present in the porous layer 5 or between the porous layer 5 and the exterior 11. Ingress of such moisture is often caused from the outside in a step of forming the positive-electrode external electrode 16. For example, in a step of immersion in a sodium hydroxide solution containing zinc, or a hydrofluoric acid or ammonium fluoride solution containing zinc in order to form the zinc layer 18, and a step of immersion in a solution containing a nickel salt and a boron hydroxide compound in order to form the first nickel layer 19, ingress of moisture is likely to be caused. In particular, the zinc layer 18 in direct contact with the aluminum layer 4 of the valve-acting metal base 6 is just formed to cover only the end surface 12 of the valve-acting metal base 6, and moisture ingress is thus likely to be caused during the immersion in the solution containing a nickel salt and a boron hydroxide compound for the subsequent formation of the first nickel layer 19.

When undesirable moisture is present in the porous layer 5 or between the porous layer 5 and the exterior 11 as described above, the moisture is vaporized and expanded in a reflow step that is carried out on the user side in the case of mounting the solid electrolytic capacitor 1, and the exterior 11 may thus swell up. This swell of the exterior 11 causes a defective shape or defective mounting of the solid electrolytic capacitor 1. In addition, this phenomenon is more noticeably caused in small-size and low-profile products in which the exterior 11 is small in thickness.

Therefore, an object of this invention is to provide a solid electrolytic capacitor and a method for manufacturing the capacitor, which can reduce the problem of moisture ingress as described above.

One aspect of the present invention is directed to a solid electrolytic capacitor comprising a laminated body that has a plurality of laminated capacitor elements. The capacitor elements are each configured to have a valve-acting metal base including a core part and a rough surface part formed along the surface of the core part, a dielectric coating film formed on the rough surface part, a solid electrolyte layer formed on the dielectric coating film, and a collector layer formed on the solid electrolyte layer, and the plurality of capacitor elements have their respective collector layers electrically connected to each other.

An electrically insulating exterior covers the laminated body, with one end surface of the valve-acting metal base exposed on a first end surface of the exterior.

A positive-electrode external electrode is provided on the first end surface of the exterior and is electrically connected to the core parts of the valve-acting metal bases; and a negative-electrode external electrode is provided on a second end surface opposed to the first end surface of the exterior, and is electrically connected to the collector layers.

The solid electrolytic capacitor according to an aspect of this invention is characterized in that, in order to solve the technical problem mentioned above, the positive-electrode external electrode includes a first conductive layer in direct contact with the core parts of the valve-acting metal bases and a second conductive layer formed on the first conductive layer, and the first conductive layer is formed to cover the end surfaces of the valve-acting metal base and at least a part of the exterior located around the end surfaces of the valve-acting metal base.

The first conductive layer, which is formed to cover the end surfaces of the valve-acting metal bases and at least a part of the exterior located around the end surfaces, thus acts to suppress moisture ingress into the rough surface parts of the valve-acting metal bases and moisture ingress between the rough surface parts and the exterior.

The first conductive layer is preferably formed by a dry process. This can skirt the concern of moisture ingress in a step of forming the first conductive layer.

The first conductive layer is preferably formed to electrically connect the core parts of the respective valve-acting metal bases of at least two of the capacitor elements adjacent to each other. This formation of the first conductive layer increases the area of the first conductive layer covering the first end surface of the exterior, and accordingly, can further enhance the suppression effect against moisture ingress due to the first conductive layer. In particular, when the first conductive layer is formed to cover the entire first end surface of the exterior, the suppression effect against moisture ingress due to the first conductive layer can be most enhanced.

Another aspect of the invention is directed to a method for manufacturing the solid electrolytic capacitor.

The method for manufacturing the solid electrolytic capacitor according to an aspect of this invention includes preparing a laminated body that has a plurality of laminated capacitor elements. The capacitor elements are each configured to have a valve-acting metal base including a core part and a rough surface part formed along the surface of the core part, a dielectric coating film formed on the rough surface part, a solid electrolyte layer formed on the dielectric coating film, and a collector layer formed on the solid electrolyte layer, and the plurality of capacitor elements have their respective collector layers electrically connected to each other.

An electrically insulating exterior covers the laminated body, with one end surface of the valve-acting metal base exposed on a first end surface of the exterior.

On the first end surface of the exterior, a positive-electrode external electrode electrically connected to the core parts of the valve-acting metal bases is provided; and, on a second end surface opposed to the first end surface of the exterior, a negative-electrode external electrode electrically connected to the collector layers is provided.

Further, the above-mentioned step of providing the positive-electrode external electrode includes a step of forming a first conductive layer in direct contact with the core parts of the valve-acting metal bases to cover the end surfaces of the valve-acting metal bases and at least a part of the exterior located around the end surfaces of the valve-acting metal bases; and a step of forming a second conductive layer on the first conductive layer.

For forming the first conductive layer, a dry process is preferably applied. The formation of the first conductive layer by the dry process can skirt the concern of moisture ingress in the step of forming the first conductive layer.

In addition, the laminated body is preferably dried before the step of providing the positive-electrode external electrode. Thus, undesirable moisture remaining in the laminated body can be removed before providing the positive-electrode external electrode.

According to aspects of this invention, the first conductive layer is formed to cover the end surfaces of the valve-acting metal bases and at least a part of the exterior located around the end surfaces, thus making it possible to suppress moisture ingress into the rough surface parts of the valve-acting metal bases and moisture ingress between the rough surface parts and the exterior. Therefore, problems can be made less likely to be caused, such as the fact that moisture is vaporized and expanded in a reflow step that is carried out on the user side in the case of mounting the solid electrolytic capacitor, and the exterior is thus swollen up. As a result, the solid electrolytic capacitor can be made less likely to cause a defective shape or defective mounting.

BRIEF EXPLANATION OF THE DRAWINGS

FIG. 4 is a cross-sectional view illustrating a conventional solid electrolytic capacitor 1 of interest to this invention.

DETAILED DESCRIPTION OF THE PREFERRED EMBODIMENTS

Figure 1:
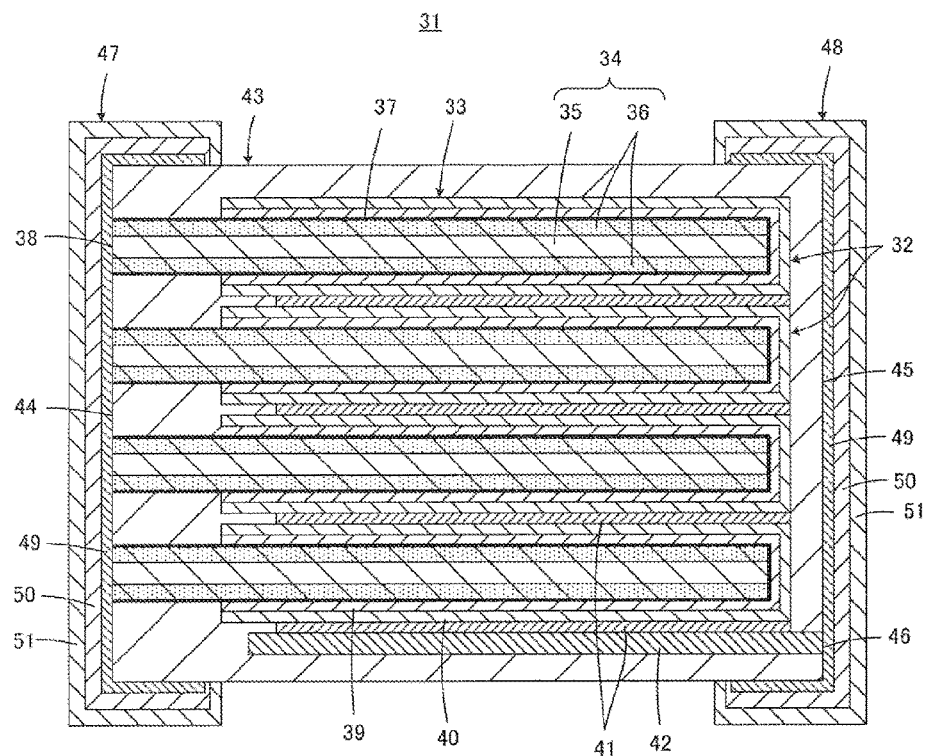
FIG. 1 is a cross-sectional view illustrating a solid electrolytic capacitor 31 according to an embodiment of this invention.

Referring to FIG. 1, a solid electrolytic capacitor 31 according to an embodiment of this invention includes a laminated body 33 that has a plurality of laminated capacitor elements 32. Each capacitor element 32 includes a valve-acting metal base 34. The valve-acting metal base 34 is composed of, for example, aluminum foil which has a surface roughened by application of etching, and thereby has a core part 35 of aluminum and a porous rough surface part 36 formed along the surface of the core part.

On the surface of the valve-acting metal base 34, a dielectric coating film 37 (indicated by a bold line in FIG. 1) is formed. The dielectric coating film 37 is formed by, for example, oxidizing the surface of the valve-acting metal base 34. It is to be noted that one end surface 38 of the valve-acting metal base 34 is not covered by the dielectric coating film 37, but exposed. This is because the core part 35 exposed at the end surface 38 of the valve-acting metal base 34 is used as a positive electrode part.

On the dielectric coating film 37, a solid electrolyte layer 39 is formed. For the formation of the solid electrolyte layer 39, a method such as chemical polymerization or electropolymerization is applied with the use of a conductive polymer material.

On the solid electrolyte layer 39, a collector layer 40 is formed. The collector layer 40 is formed by providing, for example, a carbon paste and a silver paste on the surface of the solid electrolyte layer 39.

The plurality of capacitor elements 32 bonded to each other with a conductive adhesive 41 interposed therebetween constitute the laminated body 33. The conductive adhesive 41 mechanically fixes the adjacent capacitor elements 32 to each other, and electrically connects the respective collector layers 40 of the adjacent capacitor elements 32 to each other. In addition, in the example shown, a negative electrode terminal member 42 of, for example, copper is disposed on the lower surface of the lowermost capacitor element 32. The negative electrode terminal member 42 is electrically connected to the collector layer 40 with the conductive adhesive 41 interposed therebetween.

The laminated body 33 is covered by an exterior 43. The exterior 43 is formed by molding an electrically insulating resin such as, for example, an epoxy resin with the use of a mold. Typically, after the formation of the exterior 43, parts protruded from the exterior 43 are each cut for each of the valve-acting metal bases 34 and negative electrode terminal member 42. Thus, as shown in FIG. 1, a state is achieved where one end surface 38 of the valve-acting metal base 34 is exposed on a first end surface 44 of the exterior 43, and a state is achieved where one end surface 46 of the negative electrode terminal member 42 is exposed on a second end surface 45 opposed to the first end surface 44 of the exterior 43. The previously described state where one end surface 38 of the valve-acting metal base 34 is not covered by the dielectric coating film 37 is also achieved by cutting parts of the valve-acting metal bases 34 protruded from the exterior 43 after the formation of the exterior 43.

After the exterior 43 is formed, the end surface 38 of the valve-acting metal base 34 and the end surface 46 of the negative electrode terminal member 42, which are exposed from the exterior 43, are preferably washed with pure water, and then sufficiently dried with the use of an oven or the like. For the drying, a condition such as at 120° C. for 10 minutes is applied as an example, but this condition may be changed depending on the situation. In addition, drying in vacuum can efficiently remove, for example, moisture penetrating into the rough surface part 36.

A positive-electrode external electrode 47 is provided on the first end surface 44 of the exterior 43, whereas a negative-electrode external electrode 48 is provided on the second end surface 45. The positive-electrode external electrode 47 is electrically connected to the core part 35 of the valve-acting metal base 34, whereas the negative-electrode external electrode 48 is electrically connected to the collector layer 40 with the negative-electrode terminal member 42 interposed therebetween.

The positive-electrode external electrode 47 and the negative-electrode external electrode 48 both include a first conductive layer 49, a second conductive layer 50 formed on the first conductive layer 49, and a third conductive layer 51 formed on the second conductive layer 50. The first conductive layer 49 of the positive-electrode external electrode 47 in direct contact with the core part 35 of the valve-acting metal base 34 achieves an electrical connection. The first conductive layer 49 of the negative-electrode external electrode 48 in direct contact with the negative-electrode terminal member 42 achieves an electrical connection.

It is to be noted that without including the negative-electrode terminal member 42, with a part of the collector layer 40 exposed on the second end surface 45 of the exterior 43, the thus exposed part of the collector layer 40 and the first conductive layer 49 of the negative-electrode external electrode 48 may be adapted to come into direct contact with each other.

The first conductive layers 49, the second conductive layers 50, and third conductive layers 51 are formed respectively in the following ways.

First, in order to form the first conductive layer 49 of the positive-electrode external electrode 47, a dry process is preferably used such as sputtering, vapor deposition, and CVD. In particular, in order to efficiently form the first conductive layer 49 so as to extend to not only the end surface 44 of the exterior 43, but also even a part of the side surface adjacent to the end surface 44 as shown in FIG. 1, it is more preferable to use sputtering.

In order to form the first conductive layer 49, in the case of using sputtering, the structure including the laminated body 33 and the exterior 43 is disposed in a sputtering system, with the end surface 38 of the valve-acting metal base 34 upward. In this case, in order to keep the first conductive layer 49 from being formed even in an undesirable region, a mask may be applied, such as attachment of a protective tape on the side surface of the exterior 43.

The first conductive layer 49 is supposed to have a thickness on the order of 5 to 100 nm. In addition, as the material of the first conductive layer 49, it is preferable to use titanium in order to ensure favorable adhesion to the end surface 38 of the valve-acting metal base 34. It is to be noted that, besides titanium, nichrome, chromium, and the like may be used.

In this embodiment, the first conductive layer 49 is formed so as to cover the entire end surface 44 of the exterior 43. Therefore, after taking out of the sputtering system, ingress of moisture can further reliably prevented in the rough surface part 36 and between the rough surface part 36 and the exterior 43. In addition, concern of moisture ingress in the formation of the first conductive layer 49 itself can be also skirted, because a dry process is applied for the formation of the first conductive layer 49.

After the first conductive layer 49 is formed, the second conductive layer 50 is formed. In terms of prevention of moisture ingress, a dry process is also preferably applied to the formation of the second conductive layer 50. For the formation of the second conductive layer 50, sputtering is preferably applied. In this case, it is more preferable to form the second conductive layer 50 continuously without release to the atmosphere, after forming the first conductive layer 49. This can increase the adhesion strength between the first conductive layer 49 and the second conductive layer 50.

It is to be noted that as long as there is no particular problem with adhesion, the second conductive layer 50 may be formed after release to the atmosphere. In this case, a dry process other than sputtering and a deposition method other than dry processes may be applied to the formation of the second conductive layer 50.

As the material of the second conductive layer 50, for example, monel is preferably used. The monel functions as a layer for preventing solder diffusion in mounting the solid electrolytic capacitor 31.

In this embodiment, the third conductive layer 51 is formed on the second conductive layer 50. The third conductive layer 51 is formed by applying, for example, a conductive paste containing silver as a conductive component, and baking the paste. In this case, the third conductive layer 51 is intended to serve the function of preventing oxidation.

It is to be noted that the conductive components included respectively in the second conductive layer 50 and the third conductive layer 51 may be metals other than the metals mentioned above, and can be appropriately selected from among, for example, copper, nickel, monel, tin, platinum, and gold. In addition, there is no need to form the third conductive layer 51, if there is no particular need therefor.

The first conductive layer 49, second conductive layer 50, and third conductive layer 51 of the positive-electrode external electrode 47 are formed in the ways described above.

Next, the same steps as in the case of the positive-electrode external electrode 47 are repeated to form the first conductive layer 49, second conductive layer 50, and third conductive layer 51 of the negative-electrode external electrode 48. In this case, in order to form the first conductive layer 49, the structure including the laminated body 33 and the exterior 43 is disposed in a sputtering system, with the end surface 46 of the negative-electrode terminal member 42 upward.

Further, when the structure including the laminated body 33 and the exterior 43 is put into a drying system such as an oven before forming the first conductive layer 49 of the negative-electrode external electrode 48, moisture adsorbed during release to the atmosphere can be removed, and ingress of moisture can be thus more completely suppressed.

While the first conductive layer 49 of the positive-electrode external electrode 47 is formed to cover the entire end surface 44 of the exterior 43 as shown in FIG. 1 in the embodiment described above, it is enough for the first conductive layer 49 to be formed to cover the end surfaces 38 of the valve-acting metal bases 34 and at least a part of the exterior 43 located around the end surfaces.

Figure 2:
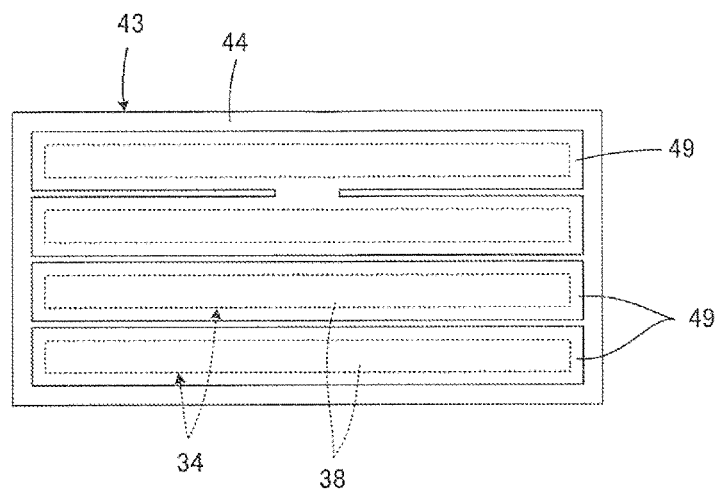
FIG. 2 is a diagram illustrating formation patterns for a first conductive layer 49 as a part of a positive-electrode external electrode 47, which is provided on a first end surface 44 of an exterior 43, for explaining another embodiment of this invention.

This will be more specifically described with reference to FIG. 2. In FIG. 2, elements corresponding to the elements shown in FIG. 1 are denoted by like reference symbols, and the repeated descriptions of the elements will be left out. FIG. 2 shows formation patterns for a first conductive layer 49 as a part of a positive-electrode external electrode, which is provided on a first end surface 44 of an exterior 43, where end surfaces 38 of valve-acting metal bases 34, masked by the first conductive layer 49, are indicated by dotted lines.

FIG. 2 illustrates, in a lower part thereof, the first conductive layer 49 formed to cover only the end surfaces 38 of the valve-acting metal bases 34 and a part of the exterior 43 located around the end surfaces. On the other hand, FIG. 2 illustrates, in an upper part thereof, the first conductive layer 49 formed to electrically connect core parts of the respective valve-acting metal base 34 of at least two adjacent capacitor elements to each other.

The two types of formation patterns for the first conductive layer 49 as shown in FIG. 2 are somewhat inferior in terms of the effect of suppressing moisture ingress, but able to produce a practically adequate effect of suppressing moisture, as compared with the formation pattern shown in FIG. 1, which is formed so that the first conductive layer 49 cover the entire end surface 44 of the exterior 43. In particular, in the case of the formation pattern for the first conductive layer 49 as illustrated in the upper part of FIG. 2, the electrical connection increases the area of the first conductive layer 49 covering the end surface 44 of the exterior 43, thereby making it possible to enhance the effect of suppressing moisture ingress with the first conductive layer 49.

Figure 3:
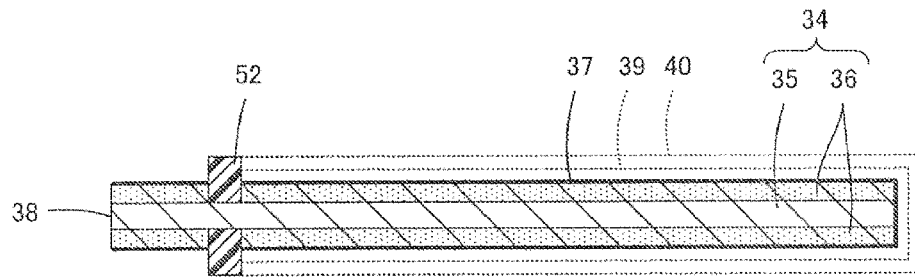
FIG. 3 is a cross-sectional view illustrating a capacitor element 32 as shown in FIG. 1 in the process of manufacture, for explaining yet another embodiment of this invention.
Figure 3:
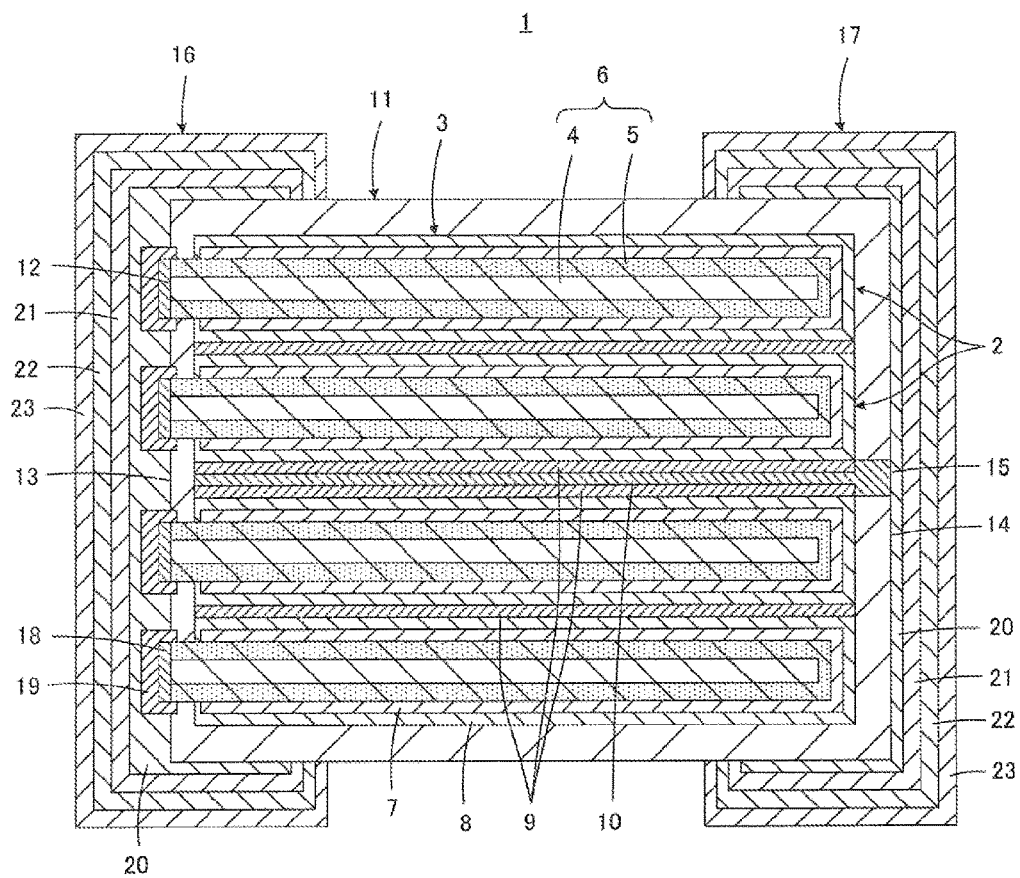

In addition, as described previously, after forming a dielectric coating film 37, a solid electrolyte layer 39 is formed by a method such as chemical polymerization or electropolymerization with the use of a conductive polymer material, and a collector layer 40 is then formed by providing a carbon paste and a silver paste. The solid electrolyte layer 39 and the collector layer 40 are intended to constitute a positive electrode part, and thus required to be kept from electrical conduction to the core parts 35 of the respective valve-acting metal base 34 which serve as a positive electrode part. Therefore, as shown in FIG. 3, regions for forming the solid electrolyte layer 39 and the collector layer 40 as shown therein by dotted lines are defined on the valve-acting metal base 34 with the dielectric coating film 37 formed, and it is thus preferable to form a masking material 52 by applying an electrically insulating resin. In this case, the resin forming the masking material 52 partially penetrates into a rough surface part 36.

DESCRIPTION OF REFERENCE SYMBOLS 31 solid electrolytic capacitor
32 capacitor element
33 laminated body
34 valve-acting metal base
35 core part
36 rough surface part
37 dielectric coating film
38 one end surface of valve-acting metal base
39 solid electrolyte layer
40 collector layer
41 conductive adhesive
42 negative electrode terminal member
43 exterior
44 first end surface of exterior
45 second end surface of exterior
46 one end surface of negative-electrode terminal member
47 positive-electrode external electrode
48 negative-electrode external electrode
49 first conductive layer
50 second conductive layer

The invention claimed is:

1. A solid electrolytic capacitor, comprising:
   (a) a laminated body that has a plurality of laminated capacitor elements, the capacitor elements each having a valve-acting metal base comprising a core part, a dielectric coating film on the core part, a solid electrolyte layer on the dielectric coating film, and a collector layer on the solid electrolyte layer, and the plurality of capacitor elements having their respective collector layers electrically connected to each other;
   (b) an electrically insulating exterior covering the laminated body and having first and second opposed end surfaces and at least first and second side surfaces extending from the first end surface, a first end surface of each of the valve-acting metal bases being exposed at the first end surface of the electrically insulating exterior;
   (c) a positive external electrode comprising:
      (i) a first electrode layer which covers the entire end surface of the electrically insulating exterior and is in direct physical contact with the core parts of the valve-action metal bases such that the valve-acting metal bases of at least two adjacent capacitor elements are electrically connected, the first electrode layer also covering at least a portion of the first and second side surfaces of the electrically insulating exterior which abut the first end surface of the electrically insulating exterior; and (ii) a second electrode layer covering the first electrode layer; and a negative external electrode at the second end surface of the electrically insulating exterior and electrically connected to the collector layers.

2. The solid electrolytic capacitor according to claim 1, wherein the positive external electrode further comprises a third conductive layer on the second conductive layer.

3. The solid electrolytic capacitor according to claim 2, wherein the negative external electrode comprises a first conductive layer in direct contact with the second end surface of the electrically insulating exterior, and a second conductive layer on the first conductive layer.

4. The solid electrolytic capacitor according to claim 3, wherein the first conductive layer covers the entire second end surface of the electrically insulating exterior.

5. The solid electrolytic capacitor according to claim 3, wherein the negative external electrode further comprises a third conductive layer on the second conductive layer.

6. The solid electrolytic capacitor according to claim 1, wherein the negative external electrode comprises a first conductive layer in direct contact with the second end surface of the electrically insulating exterior, and a second conductive layer on the first conductive layer.

7. The solid electrolytic capacitor according to claim 6, wherein the first conductive layer covers the entire second end surface of the electrically insulating exterior.

8. The solid electrolytic capacitor according to claim 6, wherein the negative external electrode further comprises a third conductive layer on the second conductive layer.

9. The solid electrolytic capacitor according to claim 1, wherein the first and second side surfaces are perpendicular to the first end surface of the electrically insulating exterior.

10. The solid state electrolytic capacitor according to claim 9, wherein the first and second side surfaces oppose each other and each extend between the first and second end surfaces of the electrically insulating exterior.

* * * * *